Aug. 30, 1966     H. LACHMAYR     3,270,112

METHOD OF MAKING SHOES

Filed Feb. 20, 1963

INVENTOR.
Horst Lachmayr
BY
Roberts, Cushman & Grover
ATT'YS

3,270,112
METHOD OF MAKING SHOES
Horst Lachmayr, York, Pa., assignor to International Vulcanizing Corporation, Boston, Mass., a corporation of Massachusetts
Filed Feb. 20, 1963, Ser. No. 259,951
4 Claims. (Cl. 264—244)

This invention relates to making shoes and especially to shoes of the kind wherein the bottom is comprised of a moldable material which is applied to shoe uppers by application of heat and pressure.

The principal objects of the invention are to provide a method of making shoes with bottom designs which are sharp, clear, exact and definitive; to provide a method for making shoes with bottom designs embodying the foregoing characteristics whether they have plane surfaces or surfaces modified by ribs, scrolls, and the like, such as are commonly employed to improve traction and enhance their appearance and to provide a method for making shoes with bottom designs which is simple, effective and proficient.

In accordance with the method, the foregoing is accomplished by assembling an upper mounted on a last, bottom blank and a thin sheet or ply of porous material with the blank sandwiched between the bottom of the upper and the ply and, while supporting the assembly in a confining mold, effecting integration of the components by application of heat and pressure. The ply may be of the same area as the blank, however, it is preferably of larger area so that the margin folds upwardly about the edge of the blank, and preferably embodies a distinctive design either as a part of the fabrication or applied thereto by printing.

The invention will now be described in greater detail with reference to the accompanying drawing wherein.

Figure 7:
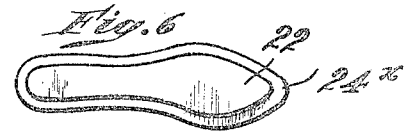
Figure 8:
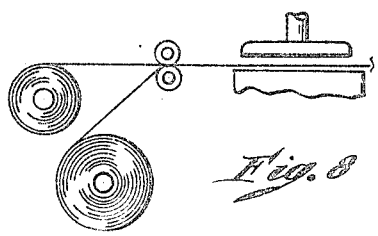

FIG. 7 is a plan view of a bottom blank resting on a ply of porous material, showing the margin extending peripherally thereof; and FIG. 8 is a diagrammatic illustration of means for feeding a strip of bottom-forming material and a strip of sheet material from rolls to a die-cutting apparatus for cutting out bottom blanks and plies of the same area to be used in making shoes acording to the method disclosed herein.

According to one method of making shoes, a moldable bottom-forming material is applied to the bottom of a lasted upper by placing the bottom-forming material in a mold having a cavity corresponding in shape to the bottom of the shoe, holding a lasted upper adjacent the open-top of the mold, and applying heat and pressure to effect integration of the bottom-forming composition to the upper. The bottom-forming composition is supplied to the shoe manufacturer in the form of a blank corresponding substantially in shape to the bottom of the shoe and of suitable thickness, of a partially cured or partially polymerized bottom-forming composition, so that the manufacturer has only to drop a blank into the mold cavity, bring a lasted upper into a position adjacent the open-top of the mold, and then to apply heat and pressure to effect attachment and molding of the bottom to the upper. Apparatus for accomplishing the foregoing is available in several forms, one such apparatus being disclosed in the Hardy patent No. 2,878,523, dated March 24, 1959. It is also customary to provide on the bottom of the mold cavity, in relief, ribs, scrolls, and the like which will form on the tread surface of the bottom, during the application of heat and pressure, a corresponding design for the purpose of improving traction and/or appearance.

Because of the sealing characteristics of the bottom-forming composition under pressure it is substantially impossible to exclude all of the air between the bottom-forming blank and the bottom of the mold cavity during the attaching operation, and wherever air is trapped the sharpness and definition of the bottom design is blurred. According to this invention, by placing on the bottom of the mold cavity between it and the bottom-forming blank, a thin sheet or ply of a porous material, which appears to provide a conductor during the preliminary application of pressure and heat, every last vestige of air is permitted to escape so that when plasticization is reached the material of the bottom will flow into the bottom design so as to form a faithful reproduction thereof which is sharp and clear. During the application of heat and pressure the sheet material itself becomes integrated with the material of the bottom blank so that the only indication of its presence is in impartation of its design to the tread surface of the bottom if there is an appreciable design, either in the texture or in printed design applied to the material. In fact, it is found that this provides an extremely simple and highly satisfactory way of applying a decorative design to the tread surface and, if desired, to the peripheral edge of the bottom, simultaneously with the attaching operation by the simple expedient of cutting a blank corresponding in shape to the bottom and of sufficient size to provide a margin, from sheet material bearing the design or pattern wanted, and applying it as related above. The possibilities of applying designs and the variety which may be applied are substantially unlimited since any fabricated sheet material bearing a suitable design, provided it is sufficiently porous, may be applied in this fashion.

Materials which may be employed are woven printed fabrics such as printed cottons used for dress goods; woven open fabrics such as cheese cloth containing one or more colored threads; unwoven fabrics such as very light, porous, felted fibers, printed or otherwise decorated; and porous paper such as tissue paper or cleaning tissues.

In the performance of the method for the purpose of applying a decorative design to the plane surface of the bottom, the sheet material will be provided with a printed design or with a design incorporated by means of different colored threads, and will preferably be applied not only to the tread surface but to the marginal edge of the sole. Where the purpose of the method is primarily to perfect sharpness and definition of an impressed design the sheet material may be of a plain color corresponding substantially to the color of the bottom blank itself and for this purpose paper is cheaper and provides the perfection desired.

Figure 1:
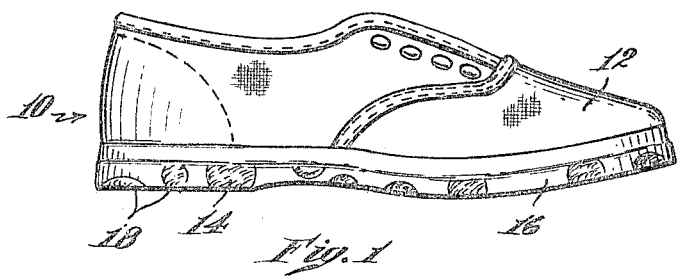
FIG. 1 is a side elevation of a finished shoe, showing the design applied to the edge of the bottom.
Figure 2:
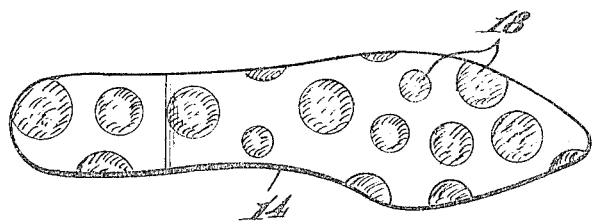
FIG. 2 is a bottom view of the finished shoe, showing a design applied to the tread surface of the bottom.
Figure 3:
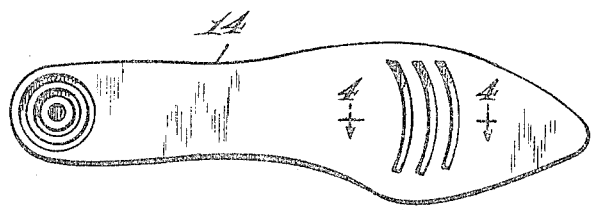
FIG. 3 is a bottom view of a shoe in which the tread surface is modified by a rib or scroll-like design.

Referring to the drawings, FIG. 1 shows in elevation a shoe 10 having a canvas upper 12 and a rubber-like bottom 14, the peripheral edge 16 of which bears a decorative design 18. The entire tread surface 20 also bears the design. The upper however may be of any material desired.

Figure 5:
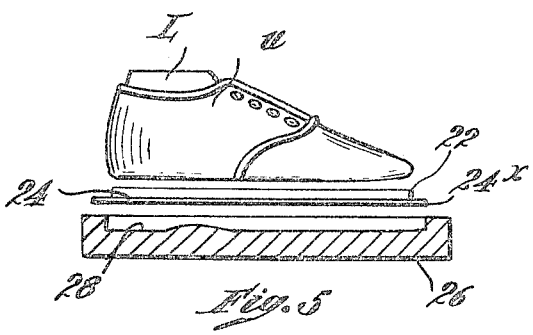
FIG. 5 is a view of the assembly of an upper on a last, a bottom blank, and a ply of porous material, ready to be thrust into a bottom-forming mold having a bottom-forming cavity.
Figure 4:
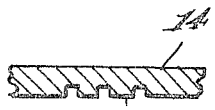
FIG. 4 is a vertical section through the modified portion of the bottom, showing the ribbed structure.
Figure 6:
FIG. 6 is a blank of fabric.

The design is applied to the peripheral edge of the bottom and the tread surface as diagrammatically shown in FIG. 5, by mounting an upper U on a last L, assembling the lasted upper with a bottom blank 22 and a sheet or ply of porous material 24 bearing the desired design with the bottom blank sandwiched between the bottom of the upper and the ply and inserting the components in a mold 26 containing a mold cavity 28 and, while holding the lasted upper against the rim of the mold cavity with sufficient pressure to prevent escape of the bottom-forming composition when it becomes fluid, applying heat to effect plasticization, integration and conformation of the plasticized material to the bottom of the lasted upper and to the mold. As stated above, the last and mold may be supported in any desired fashion relative to each other as, for example, by means of the apparatus shown in the above-identified Hardy patent, to hold the lasted upper engaged with the mold under pressure, during the application of heat, for attachment and for the purpose of carrying out the operation as expeditiously as possible.

As is shown in FIG. 5, the ply 24 has a marginal edge 24x which extends beyond the edge of the bottom blank so that when the assembly is forced into the mold cavity the marginal edge 24x is folded upwardly about the edge of the blank so that the design will be applied not only to the tread surface but to the edge. Care should be taken to trim the edge 24x so that it will not extend beyond the upper edge or corner of the sole blank.

Since the trapping of air by the bottom blank and the mold is primarily between the bottom surface of the blank and the bottom surface of the mold cavity, if the sheet material is to be used only for the purpose of securing definition and fidelity on the tread surface, the blank of sheet material may be confined in area to the tread surface of the bottom blank, in which case the bottom blank and the sheet material may conveniently be cut out simultaneously by feeding strips of the material in parallel relation to each other as shown in FIG. 8, through a die-cutting machine which dinks out the two blanks at the same time. The porous ply functions in this instance solely to expedite escape of air so that the edges and corners defining the periphery and such impressions of scrolls, ribs, and the like, which are imparted to the bottom by the mold bottom, will be sharp, clear and definitive. When the plies are cut out simultaneously with the bottoms, as related, they provide the further advantage of spacers between bottom blanks so that the blanks may be stacked, stored and shipped without sticking together.

In summary, the method provides for manufacturing shoes with a decorative tread surface and peripheral edge which is sharp, clear and definitive whether the tread surface is plain or whether it is modified by ribs, grooves, scroll work, and the like.

It should be understood that the present disclosure is for the purpose of illustration only and that this invention includes all modifications and equivalents which fall within the scope of the appended claims.

I claim:

1. The method of forming a moldable outsole at the bottom of a lasted upper comprising the steps of: providing a mold containing a mold cavity of a shape to form the tread surface and peripheral edge of the outsole to be formed; lining the bottom and side surface of the mold cavity with a porous sheet; placing a sole blank of moldable material in the cavity on the lining sheet; mounting a lasted upper on the mold over the cavity; and subjecting the sole blank, while confined between the bottom of the lasted upper and the porous lining sheet, to heat and pressure.

2. A method according to claim 1, comprising employing a porous lining sheet capable of becoming integrated with the material of the blank.

3. A method according to claim 1, comprising employing a lining sheet of woven fabrication.

4. A method according to claim 1, comprising employing a lining sheet embodying a pattern.

References Cited by the Examiner
UNITED STATES PATENTS

| | | |
|---|---|---|
| 2,763,028 | 9/1956 | Blake. |
| 2,946,713 | 7/1960 | Dusina et al. _____ 264—26 |
| 3,137,749 | 6/1964 | Bingham _____ 264—244 |

ROBERT F. WHITE, *Primary Examiner.*

L. S. SQUIRES, *Assistant Examiner.*